(12) United States Patent
Sawamura et al.

(10) Patent No.: US 7,138,086 B2
(45) Date of Patent: Nov. 21, 2006

(54) SOLDERING ALLOY

(75) Inventors: Tadashi Sawamura, Tokyo (JP); Takeo Igarashi, Tokyo (JP); Yasuhito Azuma, Tokyo (JP)

(73) Assignee: Nihom Almit Co., Ltd., Tokyo (JP)

( * ) Notice: Subject to any disclaimer, the term of this patent is extended or adjusted under 35 U.S.C. 154(b) by 0 days.

(21) Appl. No.: 11/011,396

(22) Filed: Dec. 14, 2004

(65) Prior Publication Data
US 2006/0045793 A1   Mar. 2, 2006

(30) Foreign Application Priority Data
Aug. 24, 2004   (JP) .............................. 2004-243680

(51) Int. Cl.
*C22C 13/00*   (2006.01)
*B23K 35/26*   (2006.01)

(52) U.S. Cl. ........................ 420/560; 420/561; 148/400
(58) Field of Classification Search ................ 148/400; 420/560, 561
See application file for complete search history.

(56) References Cited

FOREIGN PATENT DOCUMENTS

| JP | 02179388 | * | 7/1990 |
| JP | 2002-018589 | | 1/2002 |

* cited by examiner

*Primary Examiner*—Sikyin Ip
(74) *Attorney, Agent, or Firm*—Lucas & Mercanti, LLP

(57) ABSTRACT

There is disclosed a soldering alloy which prevents an iron tip of a soldering iron from being deteriorated. The soldering alloy comprises: 0.3 to 3% by weight of Cu; 0.01 to 0.1% by weight of Fe; 0.001 to 0.004% by weight of Ga; and a remainder including Sn and unavoidable impurities.

2 Claims, No Drawings

SOLDERING ALLOY

BACKGROUND OF THE INVENTION

1. Technical Field

The present invention relates to a soldering alloy which prevents an iron tip of a soldering iron from being deteriorated.

2. Background Art

A lead-free solder containing a main component of Sn and having enhanced wettability has heretofore been proposed in Japanese Patent Unexamined Publication Laid-Open No. 2002-18589 which is a lead-free soldering alloy obtained by adding 0.005 to 0.2% by weight of Ga to the Sn main component, or a lead-free soldering alloy obtained by adding 0.005 to 0.2% by weight of Ga to the Sn main component. Furthermore, to enhance mechanical properties of the lead-free solder, Cu, Sb, Ni, Co, Fe, Mn, Cr, Mo and the like are added. To lower a melting point, Bi, In, Zn and the like are added. Alternatively, to prevent oxidation, P, Ge and the like can be added.

DISCLOSURE OF THE INVENTION

An object of the present invention is to provide a soldering alloy which prevents an iron tip of a soldering iron from being deteriorated.

According to the present invention, there is provided a soldering alloy comprising: 0.3 to 3% by weight of Cu; 0.01 to 0.1% by weight of Fe; 0.001 to 0.004% by weight of Ga; and a remainder including Sn and unavoidable impurities.

Furthermore, according to the present invention, in the soldering alloy, at least one or more of 0.1 to 4.5% by weight of Ag, 0.05 to 0.5% by weight of Ni, 0.1 to 3.0% by weight of Bi, and 0.001 to 0.01% by weight of Mn are added to improve mechanical properties.

According to the present invention, three elements Cu, Fe, and Ga are simultaneously added to Sn which is the main component of the lead-free soldering alloy at predetermined concentrations, and therefore the iron tip of the soldering iron is prevented from being deteriorated. The deterioration of the iron tip means bite on the iron tip and oxidation, the bite on the iron tip is improved by adding Cu and Fe, and the oxidation of the iron tip is improved by adding Ga.

When Cu alone, Fe alone, and Ga alone are added, an effect of preventing the iron tip from being bitten, and an effect of preventing the oxidation is remarkably low. However, when Cu, Fe, and Ga are simultaneously added at the predetermined concentration, the iron tip is prevented from being bitten, and the oxidation is produced without impairing solderability.

When the simultaneously added amount of Cu is less than 0.3% by weight, that of Fe is less than 0.01% by weight, and that of Ga is less than 0.001% by weight, there is hardly an effect of preventing the iron tip from being deteriorated.

Furthermore, when the simultaneously added amount of Cu exceeds 3% by weight, and that of Fe exceeds 0.1% by weight, a liquid phase line temperature of the soldering alloy rises, fluidity of the soldering alloy drops, and the drop of the solderability is inappropriately caused.

Moreover, when the added amount of Ga exceeds 0.004% by weight, the surface of the soldering alloy sometimes emits a white gloss after soldering. The white gloss is unfavorable in generally performing visual appearance inspection after the soldering, because there is fear that soldering defects such as insufficient wettability and micro cracks cannot be found.

Therefore, according to the present invention, there is provided a soldering alloy comprising: 0.3 to 3% by weight of Cu; 0.01 to 0.1% by weight of Fe; 0.001 to 0.004% by weight of Ga; and a remainder including Sn and unavoidable impurities, and the soldering alloy has a superior effect of preventing the iron tip of the soldering iron from being deteriorated without impairing the solderability.

Furthermore, according to the present invention, the mechanical properties are not necessarily sufficient depending on a component or a substrate to be soldered. However, at least one or more of 0.1 to 4.5% by weight of Ag, 0.05 to 0.5% by weight of Ni, 0.1 to 3.0% by weight of Bi, and 0.001 to 0.01% by weight of Mn are added to the above-described soldering alloy, the mechanical properties are improved, and sufficient mechanical properties are imparted to soldered portions.

When the added amount of Ag is less than 0.1% by weight, that of Ni is less than 0.05% by weight, that of Bi is less than 0.1% by weight, and that of Mn is less than 0.001% by weight, there is hardly an effect of improving mechanical strength of the soldered portion. When the added amount of Ag exceeds 4.5% by weight, that of Ni exceeds 0.5% by weight, and that of Mn exceeds 0.01% by weight, the liquid phase line temperature of the soldering alloy rises, and the drop of the solderability is inappropriately caused.

Moreover, when the added amount of Bi exceeds 3.0% by weight, a low-melting compound of Sn—Bi is sometimes formed in the soldering alloy. In the low-melting compound, a part of the soldering alloy sometimes melts at low temperature of about 140° C., and this is not unfavorable because strength drop is caused.

BEST MODE FOR CARRYING OUT THE INVENTION

An example of the present invention will be described hereinafter.

Three types of elements Cu, Fe, and Ga were simultaneously added to Sn, and deterioration confirmation test of an iron tip was performed using a soldering iron.

Soldering alloys containing: 0.1% by weight, 0.3% by weight, 0.7% by weight, 3.0% by weight of Cu; 0.005% by weight, 0.01% by weight, 0.05% by weight, 0.1% by weight of Fe; 0.001% by weight, 0.004% by weight of Ga; and a remainder including Sn and unavoidable impurities were prepared.

Each prepared soldering alloy was worked into a resin-containing solder (resin-containing solder flux was an A-class product by JIS Z3283:2001, flux content of 3.5%, linear diameter of 0.8 mm, and the resin-containing solder was supplied to an iron tip using a soldering robot.

It is to be noted that 5 mm of the resin-containing solder was supplied per shot at a testing temperature of 350±3° C., 20000 shots were continuously supplied, thereafter appearance of the iron tip was observed, and a deteriorated state of the iron tip was evaluated. A test result at this time is shown in Table 1.

TABLE 1

Result of deterioration check test of iron tip in each soldering alloy

| | Sn weight % | Ag weight % | Cu weight % | Fe weight % | Ga weight % | Test result |
|---|---|---|---|---|---|---|
| Example 1 | Remainder | | 0.3 | 0.01 | 0.001 | ○ |
| Example 2 | Remainder | | 0.3 | 0.01 | 0.004 | ○ |
| Example 3 | Remainder | | 0.3 | 0.1 | 0.001 | ○ |
| Example 4 | Remainder | | 0.3 | 0.1 | 0.004 | ○ |
| Example 5 | Remainder | | 0.7 | 0.01 | 0.001 | ○ |
| Example 6 | Remainder | | 0.7 | 0.01 | 0.004 | ○ |
| Example 7 | Remainder | | 0.7 | 0.05 | 0.001 | ○ |
| Example 8 | Remainder | | 0.7 | 0.05 | 0.004 | ○ |
| Example 9 | Remainder | | 0.7 | 0.1 | 0.001 | ○ |
| Example 10 | Remainder | | 0.7 | 0.1 | 0.004 | ○ |
| Example 11 | Remainder | | 3.0 | 0.01 | 0.001 | ○ |
| Example 12 | Remainder | | 3.0 | 0.01 | 0.004 | ○ |
| Example 13 | Remainder | | 3.0 | 0.1 | 0.001 | ○ |
| Example 14 | Remainder | | 3.0 | 0.1 | 0.004 | ○ |
| Comparative example 1 | Remainder | | 0.7 | | | X |
| Comparative example 2 | Remainder | | 3.0 | | | X |
| Comparative example 3 | Remainder | 3.0 | 0.5 | | | X |
| Comparative example 4 | Remainder | 3.5 | 0.7 | | | X |
| Comparative example 5 | Remainder | | | 0.1 | | X |
| Comparative example 6 | Remainder | | | | 0.004 | X |
| Comparative example 7 | Remainder | | 0.1 | 0.005 | 0.001 | X |
| Comparative example 8 | Remainder | | 0.1 | 0.005 | 0.004 | Δ |
| Comparative example 9 | Remainder | | 0.1 | 0.01 | 0.001 | Δ |
| Comparative example 10 | Remainder | | 0.1 | 0.01 | 0.004 | Δ |
| Comparative example 11 | Remainder | | 0.1 | 0.1 | 0.001 | Δ |
| Comparative example 12 | Remainder | | 0.1 | 0.1 | 0.004 | Δ |
| Comparative example 13 | Remainder | | 0.3 | 0.005 | 0.001 | Δ |
| Comparative example 14 | Remainder | | 0.3 | 0.005 | 0.004 | Δ |
| Comparative example 15 | Remainder | | 3.0 | 0.005 | 0.001 | Δ |
| Comparative example 16 | Remainder | | 3.0 | 0.005 | 0.004 | Δ |

Symbol ○ indicating the test result: There was hardly deterioration of the iron tip.
Δ: A part of the iron tip was oxidized black, or the iron tip was partially bitten.
X: All of the iron tip was oxidized black, or the iron tip was heavily bitten.

In comparative examples of resin-containing soldering alloys comprising: 0.7% by weight of Cu and the remainder of Sn; 3.0% by weight of Cu and the remainder of Sn; 3.0% by weight of Ag, 0.5% by weight of Cu, and the remainder of Sn; 3.5% by weight of Ag, 0.7% by weight of Cu, and the remainder of Sn; 0.1% by weight of Fe and the remainder of Sn; and 0.004% by weight of Ga and the remainder of Sn, the iron tips were remarkably deteriorated after 20000 shots.

Moreover, even in a part of the resin-containing solder to which 0.1% by weight of Cu, and 0.005% by weight of Fe were added, the deterioration of the iron tip after 20000 shots was confirmed.

On the other hand, in the examples of the resin-containing soldering alloy in which 0.3% by weight to 3.0% by weight of Cu, 0.01% by weight to 0.1% by weight of Fe, and 0.001% by weight to 0.004% by weight of Ga were simultaneously added to Sn, the iron tips were hardly deteriorated even after 20000 shots.

It has been evident from the above-described results that the soldering alloy containing 0.3% by weight to 3.0% by weight of Cu, 0.01% by weight to 0.1% by weight of Fe, 0.001% by weight to 0.004% by weight of Ga, and the remainder including Sn and unavoidable impurities has a superior oxidation preventing effect against the deterioration of the iron tip.

Next, a bonding strength test of the soldered portion was performed in order to inspect the mechanical properties of the soldering alloy containing mechanical property improving elements further added to the above-described soldering alloy in which three types of elements Cu, Fe, and Ga were simultaneously added to Sn.

Soldering alloys containing: 0.3% by weight, 0.5% by weight, 0.7% by weight, 3.0% by weight of Cu; 0.01% by weight, 0.03% by weight, 0.05% by weight, 0.1% by weight of Fe; 0.001% by weight, 0.003% by weight, 0.004% by weight of Ga; 0.1% by weight, 1.0% by weight, 3.0% by weight, 4.5% by weight of Ag; 0.05% by weight, 0.1% by weight, 0.5% by weight of Ni; 0.1% by weight, 0.5% by weight, 3.0% by weight of Bi; 0.001% by weight, 0.01% by weight of Mn; and a remainder including Sn and unavoidable impurities were prepared.

A pin of a φ1.6 mm Cu wire was inserted into a single-faced substrate (material: paper phenol, thickness: 1.6 mm, copper pattern, land outer diameter: 3.5 mm), a soldering alloy worked into a foil state was wound, and the soldering was performed with a soldering iron.

As the flux, liquid flux was used (liquid flux was A-class product conforming to JIS Z 3283:2001).

A soldered test piece was left to stand in a constant-temperature bath at 100° C. for one hour in order to remove thermal stress, maximum bonding strength was measured using a tensile tester, and mechanical properties of a soldered portion were evaluated.

It is to be noted that the bonding strength was measured at room temperature at tensile speed of 10 mm/min. Test results at this time are shown in Table 2.

TABLE 2

Bonding strength test result in each soldering alloy

| | Sn wt % | Ag wt % | Cu wt % | Fe wt % | Ga wt % | Ni wt % | Bi wt % | Mn wt % | Bonding strength Kgf |
|---|---|---|---|---|---|---|---|---|---|
| Example 1 | Remainder | | 0.3 | 0.01 | 0.001 | | | | 28.2 |
| Example 15 | Remainder | | 0.7 | 0.05 | 0.003 | | | | 27.3 |
| Example 16 | Remainder | | 3.0 | 0.1 | 0.004 | | | | 27.3 |
| Example 17 | Remainder | 0.1 | 0.5 | 0.01 | 0.001 | | | | 30.1 |
| Example 18 | Remainder | 0.1 | 3.0 | 0.01 | 0.001 | | | | 31.2 |
| Example 19 | Remainder | 1.0 | 0.5 | 0.01 | 0.001 | | | | 32.5 |
| Example 20 | Remainder | 1.0 | 3.0 | 0.1 | 0.004 | | | | 32.0 |
| Example 21 | Remainder | 3.0 | 0.5 | 0.01 | 0.001 | | | | 32.5 |
| Example 22 | Remainder | 3.0 | 3.0 | 0.1 | 0.004 | | | | 32.0 |
| Example 23 | Remainder | 3.0 | 0.5 | 0.03 | 0.003 | | | | 33.2 |
| Example 24 | Remainder | 4.5 | 0.5 | 0.01 | 0.001 | | | | 36.2 |
| Example 25 | Remainder | 4.5 | 3.0 | 0.1 | 0.004 | | | | 35.9 |
| Example 26 | Remainder | | 0.5 | 0.01 | 0.001 | 0.05 | | | 33.1 |
| Example 27 | Remainder | | 3.0 | 0.1 | 0.004 | 0.05 | | | 33.6 |
| Example 28 | Remainder | | 0.3 | 0.01 | 0.001 | 0.1 | | | 33.1 |
| Example 29 | Remainder | | 0.7 | 0.03 | 0.003 | 0.1 | | | 34.2 |
| Example 30 | Remainder | | 3.0 | 0.1 | 0.004 | 0.1 | | | 34.1 |
| Example 31 | Remainder | | 0.3 | 0.01 | 0.001 | 0.5 | | | 33.6 |
| Example 32 | Remainder | | 0.7 | 0.03 | 0.003 | 0.5 | | | 34.9 |
| Example 33 | Remainder | | 3.0 | 0.03 | 0.003 | 0.5 | | | 34.6 |
| Example 34 | Remainder | | 0.5 | 0.01 | 0.001 | | 0.1 | | 35.1 |
| Example 35 | Remainder | | 3.0 | 0.1 | 0.004 | | 0.1 | | 34.7 |
| Example 36 | Remainder | | 0.5 | 0.01 | 0.001 | | 0.5 | | 36.2 |
| Example 37 | Remainder | | 3.0 | 0.1 | 0.004 | | 0.5 | | 35.7 |
| Example 38 | Remainder | | 0.5 | 0.01 | 0.001 | | 3.0 | | 39.1 |
| Example 39 | Remainder | | 3.0 | 0.1 | 0.004 | | 3.0 | | 39.5 |
| Example 40 | Remainder | | 0.3 | 0.01 | 0.001 | | | 0.001 | 32.5 |
| Example 41 | Remainder | | 0.7 | 0.03 | 0.003 | | | 0.001 | 33.4 |
| Example 42 | Remainder | | 3.0 | 0.1 | 0.004 | | | 0.001 | 33.8 |
| Example 43 | Remainder | | 0.5 | 0.01 | 0.001 | | | 0.01 | 32.8 |
| Example 44 | Remainder | | 3.0 | 0.1 | 0.004 | | | 0.01 | 34.0 |
| Example 45 | Remainder | 3.0 | 0.5 | 0.03 | 0.003 | | | 0.001 | 32.6 |
| Example 46 | Remainder | 3.0 | 0.5 | 0.03 | 0.003 | 0.1 | | 0.001 | 33.0 |
| Example 47 | Remainder | | 0.3 | 0.01 | 0.001 | 0.1 | | 0.001 | 34.1 |
| Example 48 | Remainder | | 0.7 | 0.03 | 0.003 | 0.1 | | 0.001 | 34.6 |
| Example 49 | Remainder | | 3.0 | 0.1 | 0.004 | 0.1 | | 0.001 | 34.6 |
| Example 50 | Remainder | | 3.0 | 0.1 | 0.004 | 0.5 | | 0.01 | 35.1 |
| Example 51 | Remainder | | 0.3 | 0.01 | 0.001 | | 0.1 | 0.001 | 33.0 |
| Example 52 | Remainder | | 0.7 | 0.03 | 0.003 | | 0.1 | 0.001 | 33.4 |
| Example 53 | Remainder | | 3.0 | 0.1 | 0.004 | | 0.1 | 0.001 | 32.6 |
| Example 54 | Remainder | | 3.0 | 0.1 | 0.004 | | 0.5 | 0.01 | 34.9 |
| Example 55 | Remainder | 3.0 | 0.5 | 0.03 | 0.003 | 0.1 | 0.5 | 0.001 | 36.1 |
| Example 56 | Remainder | 3.0 | 0.5 | 0.03 | 0.003 | 0.1 | 3.0 | 0.001 | 40.2 |
| Comparative example 1 | Remainder | | 0.7 | | | | | | 27.5 |
| Comparative example 2 | Remainder | | 3.0 | | | | | | 28.1 |
| Comparative example 3 | Remainder | 3.0 | 0.5 | | | | | | 30.1 |
| Comparative example 4 | Remainder | 3.5 | 0.7 | | | | | | 31.3 |
| Comparative example 5 | Remainder | | | 0.1 | | | | | 26.9 |
| Comparative example 6 | Remainder | | | | 0.004 | | | | 27.2 |

In the soldering alloy to which mechanical property improving elements Ag, Ni, Bi, and Mn were added, the maximum bonding strength rose to 20% from about 5% as compared with the soldering alloy to which any mechanical property improving element was not added.

As a result, it has been evident that at least one or more selected from a group consisting of 0.1 to 4.5% by weight of Ag, 0.05 to 0.5% by weight of Ni, 0.1 to 3.0% by weight of Bi, and 0.001 to 0.01% by weight of Mn are added to the soldering alloy having a superior effect of preventing the iron tip from being deteriorated, and accordingly it is possible to impart sufficient mechanical properties to the soldered portion.

INDUSTRIAL APPLICABILITY

The present invention is used in preventing an iron tip of a soldering iron for use mainly in soldering using a lead-free solder from being deteriorated.

Furthermore, the present invention is sometimes used in a jet soldering bath.

What is claimed is:

1. A soldering alloy consisting essentially of 0.3 to 3% by weight of Cu; 0.01 to 0.1% by weight of Fe; 0.001 to 0.004% by weight of Ga; and a remainder including Sn and unavoidable impurities.

2. The soldering alloy according to claim 1, wherein at least one or more of 0.1 to 4.5% by weight of Ag, 0.05 to 0.5% by weight of Ni, 0.1 to 3.0% by weight of Bi, and 0.001 to 0.01% by weight of Mn are added to improve mechanical properties.

* * * * *